United States Patent [19]

Johnson

[11] 4,039,626

[45] Aug. 2, 1977

[54] CARBON BLACK PROCESS

[75] Inventor: Paul H. Johnson, Bartlesville, Okla.

[73] Assignee: Phillips Petroleum Company, Bartlesville, Okla.

[21] Appl. No.: 599,752

[22] Filed: July 28, 1975

Related U.S. Application Data

[60] Division of Ser. No. 406,385, Oct. 15, 1973, Pat. No. 3,918,914, which is a continuation-in-part of Ser. No. 253,027, May 15, 1972, abandoned, which is a division of Ser. No. 830,611, June 5, 1969, Pat. No. 3,681,031.

[51] Int. Cl.$^2$ .............................................. C09C 1/50
[52] U.S. Cl. .................................................... 423/456
[58] Field of Search ....................... 423/450, 455, 456; 23/259.5

[56] References Cited

U.S. PATENT DOCUMENTS

| 3,301,639 | 1/1967 | DeLand | 23/259.5 X |
|---|---|---|---|
| 3,355,247 | 11/1967 | Krejci et al. | 423/455 |
| 3,490,869 | 1/1970 | Heller | 423/456 X |
| 3,522,005 | 7/1970 | Braddock | 423/455 |

Primary Examiner—Edward J. Meros

[57] ABSTRACT

A method and apparatus for introducing combustion gases into a carbon black furnace, the method involving the introduction of the combustion gases at variable velocities to affect the structure of the black by affecting the extent of the contact between the hydrocarbon feed and the combustion gases. The apparatus includes means for varying the introduction velocity of the combustion gases.

4 Claims, 4 Drawing Figures

CARBON BLACK PROCESS

This application is a division of application Ser. No. 406,385, filed Oct. 15, 1973, now U.S. Pat. No. 3,918,914, which is a continuation-in-part of application Ser. No. 253,027, filed May 15, 1972, now abandoned, which was a division of application Ser. No. 830,611, filed June 5, 1969, now U.S. Pat. No. 3,681,031.

This invention pertains to a method for producing carbon black.

In one of its more specific aspects, this invention pertains to controlling carbon black properties by controlling the velocity imparted to the hot combustion gases employed to bring the hydrocarbon feed to its pyrolytic decomposition temperature.

Many types of carbon black reactors are conventionally employed. In one of the more widely used reactors, known as the precombustion or combustion type reactor, there exists a precombustion zone. Generally, combustion gases are introduced into the reactor from this precombustion zone into the combustion zone to form a reactant mass flowing helically with respect to those reactants introduced axially into the reactor and flowing axially through the reactor.

The diameter of the combustion zone is generally considerably larger than that of the axial path through it. While radial introduction of the reactants into the combustion zone can be made, generally introduction is made tangential to the axial flow. Due to the conventional circular configuration of the combustion zone, tangential introduction of the gases thereinto causes them to encircle the axial flow, and to establish themselves as a helically-flowing mass peripheral to the axial-flowing mass. Accordingly, interaction between the axially-introduced reactants and the helically-flowing hot combustion gases is primarily limited to the boundary layer between them, and interaction between these masses becomes a function of the disturbance effected within this boundary layer. Therefore, the rotational velocity of the helically-flowing mass of gases has an effect on this interaction and, resultingly, on the quality of the carbon black produced as reflected by its structure.

This rotational velocity is affected by the quantities of the reactants introduced, the velocity of introduction and other factors. There has now been developed a reactor which permits control of this rotational velocity. The apparatus of this invention provides such a reactor.

According to the apparatus of this invention, there is provided a carbon black reactor comprising a plurality of zones, or sections in axial, contiguous alignment, at least one of said sections being adapted for introduction therethrough of some portion of reactants peripheral to the longitudinal axis of the reactor, and means for varying the rotational velocity of the reactants introduced therefrom.

According to the method of this invention, there is provided a process for producing carbon black in which air and fuel or hot combustion gases are introduced peripheral to the axial flow of hydrocarbon feed to form a reactant mass having an inner axial-flowing mass of hydrocarbon feed and an outer helical-flowing mass of hot combustion gases. The reactant mass is passed through the reactor under such conditions as to form carbon black, the improvement comprising controlling the velocity of introduction of the helical-flowing mass to control at least one property of the carbon black product.

In one embodiment of this invention the reactor is provided with a combustion zone adapted for introduction of reactants peripheral to the longitudinal axis of the reactor, means being provided within that zone for varying the rotational speed of the reactants introduced thereinto.

In another embodiment of this invention, the reactor is adapted with a plurality of zones of differing diameters, each zone being adapted for introduction of reactants peripheral to the longitudinal axis of the reactor, means being provided for selecting that zone through which reactant introduction is made, the speed of the reactants introduced being related to the diameter of the zone selected.

Accordingly, it is an object of this invention to provide a novel carbon black reactor by means of which a wide variety of carbon blacks can be produced.

It is another object of this invention to provide a carbon black reactor by means of which carbon black of controlled structure can be produced.

The apparatus of this invention is operable in any of the conventional carbon black-producing processes in which carbon black is produced by the pyrolytic decomposition of a hydrocarbon in the presence of an oxidant, preferably air, and a fuel, or hot combustion gases, the fuel being introduced as separate material or being derived from the hydrocarbon itself. Similarly, the apparatus of this invention can have any number of contiguous reaction zones. While the subsequent description of the apparatus of this invention is in terms of an axial type reactor in which the zones are the axial zone, the combustion zone, and the reaction zone, the apparatus of this invention also includes reactors in which the axial zone is not employed, or is nonexistent, and in which the principal portion of hydrocarbon feed is introduced into the combustion zone.

This invention will be more easily understood when explained in conjunction with the attached drawings in which FIG. 1 depicts one embodiment of this invention, showing an elevational view of the apparatus.

In all figures the internal configuration of the reaction zones is shown, omitting, for purposes of simplicity, the insulation external thereto and the external shell of the reactor, since these omitted features form no part of this invention.

Figure 1:
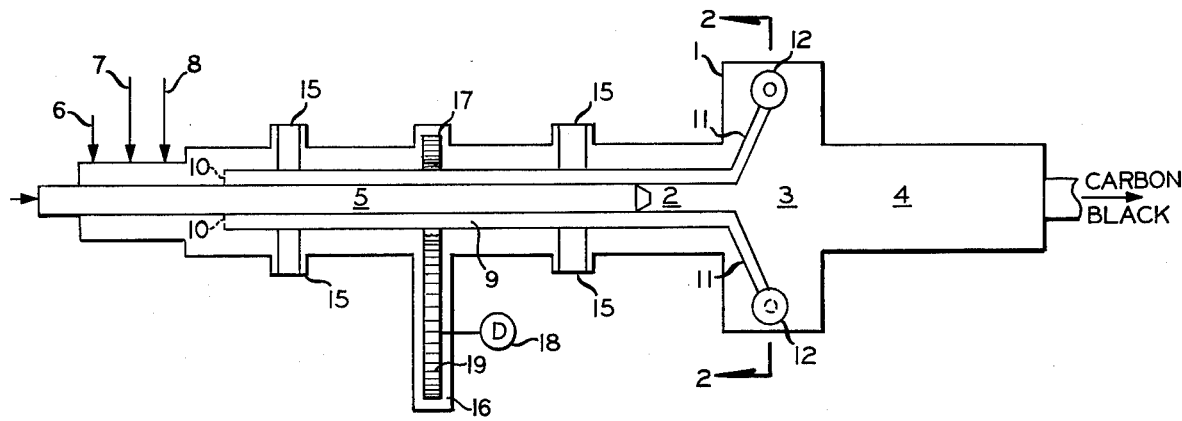

Referring now to FIG. 1, there is shown the internal configuration of reactor 1 having axial zone 2, combustion zone 3, and reaction zone 4, the downstream portion of the reactor including conduit means for recovering the carbon black being omitted. Passage of reactants through the reactor is axially from zone 2 to zone 4. Combustion zone 3 has a greater diameter than that of zones 2 and 4 which may be of any suitable diameter in relation to each other.

Axial zone 2 is adapted with inlet tube 5 through which any of the reactants, but preferably the hydrocarbon feed, can be introduced into zone 2. Adjustment of oil inlet tube 5 can be made by means of conventional slip joints to introduce reactants into combustion zone 3.

Introduced into the upstream portion of axial zone 2 through conduits 6, 7, and 8 are air, a fuel such as natural gas, and hot combustion gases, respectively. Positioned, preferably in peripheral relationship to oil inlet tube 5, is conduit 9 which acts as a combustion gas introductory conduit. For purposes of simplicity, the term "combustion gases" will be employed hereinafter as meaning either air and fuel or combustion gases, per se.

Conduit 9 is adapted at its upstream end with apertures 10 and at its downstream end with outwardly extending conduits 11. Conduit 9 is supported along its length by a plurality of supports 15, and is affixed at a suitable point along its length to gear 17 which enmeshes with gear 19 driven by variable-speed drive means 18. The gears are encased by closure 16.

Rotatable supports 15 act to support conduit 9 within axial zone 2 and to prevent leakage of those materials introduced through conduits 6, 7, and 8. Hence, hot combustion gases introduced pass into conduit 9 through apertures 10 and through conduit 9 into legs 11 from which discharge is made through nozzles 12.

Any suitable number of legs 11 and discharge nozzles 12 can be employed. Nozzles 12 will be of any suitable configuration, adapted for the tangential introduction of the hot combustion gases into zone 3, either as such, or in the form of hot combustion gases produced by the combustion of fuel with oxidant at nozzles 12, introduction being made generally tangentially to the inner wall of the reactor. Generally, all nozzles 12 will be positioned to discharge in the same direction and will be positioned to discharge tangentially to the circumference of zone 3 at any point beyond the outer circumference of axial zone 2.

As mentioned, conduit 9 is adapted with a plurality of supports 15 and gear 17. Rotatable supports 15 allow conduit 9 to be rotated at selected speeds of rotation through drive means 18.

Conduit 9 is preferably a single conduit encircling inlet tube 5, with one or more individual legs 11 branching out from conduit 9. However, a plurality of individual conduits 9, each with its conduits 11, can be supplied in encircling relationship to inlet tube 5.

Accordingly, it will be seen that those reactants introduced into conduit 9 pass through conduits 11 and discharge through nozzles 12. As such, the hot combustion gases can have imparted to them suitable and variable velocities depending upon the speed of rotation imparted to nozzles 12 through rotary drive means 18 and the discharge velocity from the nozzles.

Figure 2:
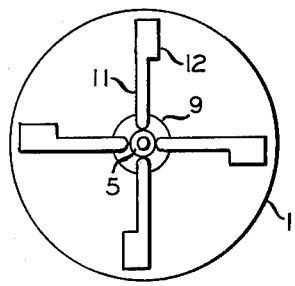
FIG. 2 is a cross-sectional view of the apparatus of FIG. 1 taken along section 2—2 of FIG. 1.

FIG. 2 shows one conception of nozzles 12 although any suitable configuration may be employed.

Figure 3:
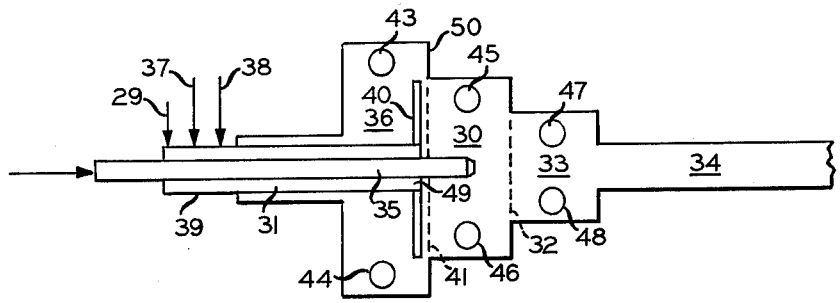
FIG. 3 depicts a second embodiment of this invention, showing a cross-sectional view of the apparatus in elevation.

In FIG. 3, there is shown in elevation the internal configuration of reactor 50 having axial zone 31 and reaction zone 34. Interpositioned between these zones is a plurality of combustion zones 36, 30, and 33, each of a different diameter. While only three zones are shown, any number of zones can be employed. Similarly, while these zones are shown as decreasing in diameter in a direction from axial zone 31 to reaction zone 34, these combustion zones can have any desired diameter, with no regularity being required.

The reactor is adapted with oil tube 35 which can be positioned to discharge into axial zone 31 or into any of the various combustion zones. Axial zone is adapted by means of conduits 29, 37, and 38 for introduction of any of the various reactants peripheral to oil tube 35.

Each combustion zone is adapted with any suitable number of ports for the introduction of any of the reactants thereinto. Zone 36 is equipped with ports 43 and 44, zone 30 is equipped with ports 45 and 46, and zone 33 is equipped with ports 47 and 48. These ports are comparable to those of reactors having a single combustion zone and can be employed to introduce reactants or the products of combustion from the oxidation of fuel with an oxidant.

Extending exteriorly from axial zone 31, and slidably adjustable into the reactor from the exterior of the reactor, by means of conventional slip joints, is tube 39. Affixed to its internal end is plate 40 which is of a configuration congruent with the configuration of the zone 30. As such, plate 40 is movably positionable at any location from the upstream wall of combustion zone 36 to that imaginary line 32 separating zone 30 from zone 33. It is further positionable such that oil inlet tube 35 is extendable through tube 39 and through opening 49 around tube 35 to discharge downstream of that locus at which plate 40 is positioned.

When plate 40 is positioned at the upstream wall of combustion zone 36, introduction of reactants can be made through one or more of those ports downstream of the plate, introduction of reactants through ports upstream of the plate being largely obstructed from entering the downstream portion of the reactor by plate 40. In any instance, introduction of reactants can be made through all the ports downstream of the position of the plate 40. In all instances, the quantity of the reactants introduced is largely determinative of the velocity with which the reactants encircle the axial flow. If a single set of ports is used, the diameter of the zone employed will be largely determinative of the velocity imparted to the gases encircling the axial flow.

In respect to the size of the various combustion zones, it is only desirable that the smallest of the combustion zones be greater in diameter than the diameter of the axial flow path therethrough through the reactor. Opening 49 can be of any desired size.

It will be appreciated that a reactor comprising more than three combustion zones and a plurality of tubes 39, each carrying a different size plate 40, can be employed. In this instance, each tube 39 is adapted for adjustment from the exterior of the reactor, and each plate is of such size as to conform to the requirements of restricting flow from the zones upstream of its positioning.

Figure 4:
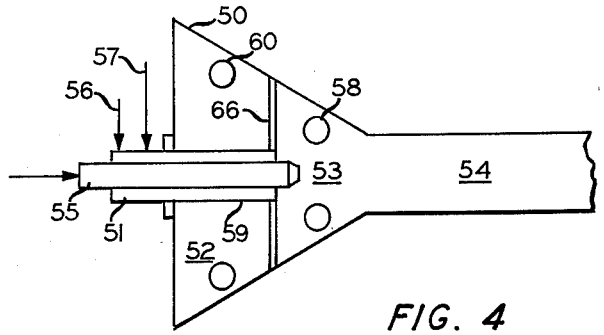
FIG. 4 is an elevational view of a third embodiment of this invention.

If but two combustion zones are employed, a single plate can be used in a reactor comparable to the configuration shown in FIG. 4.

In FIG. 4, reactor 50 is comprised of axially contiguous zones 51, 52, 53 and 54.

Axial zone 51 is adapted with adjustable nozzle 55 through which reactants can be introduced. It is also adapted with conduits 56 and 57 for the introduction of reactants. Plate 66 on rod 59 is adjustable from upstream wall of zone 52 to a position between zones 52 and 53.

Zone 52 is provided with ports 60 and zone 53 is provided with ports 58 for the introduction of reactants. Positioning of plate 66 and nozzle 55, with reactants being introduced through conduits 56 and 57 around nozzle 55, allows all reactants to be introduced into either zone 52 or zone 53 with the result that the velocity of the reactants forming the mass circumferential to the axially-introduced reactants can be selected.

The following demonstrates the effect of the rotational velocity of the hot combustion gases employing the reactor of FIG. 1.

The axial reactor will have three zones. The hydrocarbon feed is introduced through conduit 5 axially through zone 2 into zone 3. Air and fuel can be introduced separately or in the form of hot combustion gases are rotatingly introduced into zone 3 to impart a nozzle discharge velocity and a rotational velocity to the hot combustion gases and to establish the hot combustion gases in helical flow relationship to the axially-introduced hydrocarbon feed. The hydrocarbon feed is contacted with the hot combustion gases under carbon black forming conditions to form carbon black. It will be seen from the following that the structure of the carbon black can be controlled and regulated by the rotational velocity imparted to the hot combustion gases.

In all instances the diameter of zone 3 is 37 inches. The diameter of zone 4 is 10 inches and four nozzles 12 evenly spaced apart and located on a 30 inch diameter circle are employed. Each nozzle has a 6 inch diameter outlet.

The hydrocarbon feed is an $SO_2$ extract oil having a BMCI of 100. The fuel is 1000 BTU fuel gas and the oxidant is air. The fuel and air are introduced through conduits 6 and 7 and form a combustible mixture as they pass through conduit 9. The combustion mixture is burned to form hot combustion gases upon emission from nozzles 12.

Two sources of velocity are imparted to the hot combustion gases emitted from nozzles 12. The first is due to the exit velocity from the nozzles. The second is due to the speed of rotation of conduit 9 and nozzles 12. These velocities are additive in their effect and it is immaterial what proportion of the total velocity is imparted by either of the two components.

The effect of the introduction of the hot combustion gases in the manner described is to establish the hot combustion gases as a mass flowing helically and peripherally to the centrally-flowing hydrocarbon feed. As the hot combustion gases contact the hydrocarbon feed, the hydrocarbon feed is increased in temperature to its decomposition temperature at which carbon black is formed. The carbon black is then recovered from the downstream portion of zone 4.

Under the above described conditions and the specific conditions set forth below, the structure of the carbon black, as reflected by its dibutylphthalate number, varies with the total velocity imparted to the hot combustion gases as indicated below.

| Process Conditions | |
|---|---|
| Hydrocarbon feed, GPH | 220 |
| Combustion air, MSCFH | 150 |
| Fuel gas, MSCFH | 10 |
| Reactor temperature, °F | 2800 |
| Reactor pressure, psig | 1 |
| Nozzle velocity of hot combustion gases, fps at 2800° F | 348 |
| Rotational velocity of hot combustion gases, fps | 78 |
| Total hot combustion gases velocity, fps | 426 |
| Product Properties (Estimated) | |
| Production, No. carbon black/gal. feed/hr. | 4.3 |
| Carbon black structure, DBP, cc/100g | 123 |
| Nitrogen surface area, m²/gm | 86 |
| Photelometer | 90 |
| Reactor Configuration | |
| Number of nozzle outlets | 4 |
| Diametric spacing between nozzles, inches | 30 |
| Nozzle rotation rev. per sec. | 10 |

Under similar process conditions in which the total velocity of the combustion gases is controlled by adjusting the speed of rotation of the nozzle outlet, the dibutylphthalate number of the carbon black will be as follows:

| Rotation, RPSec. | Total Velocity Imparted to Combustion Gases, ft./sec. | Carbon Black DBP cc/100g |
|---|---|---|
| 10 | 426 | 123 |
| 20 | 505 | 115 |
| 40 | 662 | 95 |

As will be seen from the above, as the total velocity imparted to the combustion gases is increased, the structure of the carbon black is decreased.

It will be seen that the method of this invention allows the total velocity imparted to the hot combustion gases to be altered by means of two variables. Accordingly, it is possible to impart higher total velocities to the hot combustion gases using the method of this invention than is possible by use of a single component as, for example when the hot combustion gases are introduced only through stationary combustion nozzles formed in the reactor, itself. The rotation of the nozzle outlet, of course, can be in the opposite direction to decrease the velocity of the combustion gases to further increase the DBP value.

It will be evident from the above that various modifications can be made to the method of this invention. Such, however, are considered as being within the scope of the invention.

What is claimed is:

1. A process for producing carbon black comprising
   a. introducing a hydrocarbon feed axially into a reactor which comprises a plurality of nozzles for the tangential discharge of hot combustion gases, said nozzles being arranged for rotation around the reactor axis,
   b. introducing hot combustion gases through said nozzles tangentially into said reactor,
   c. rotating said nozzles around said axis at a rotational velocity such as to impart a discharge velocity and a rotational velocity to said hot combustion gases and to establish said hot combustion gases in a helical flow relationship to the axially flowing hydrocarbon feed,
   d. contacting said hydrocarbon feed with said hot combustion gases under carbon black-forming conditions to form carbon black, the structure of said carbon black being controlled by the rotational velocity imparted to said hot combustion gases, and
   e. recovering carbon black-contacting smoke from said reactor.

2. A process in accordance with claim 1 wherein the structure of the carbon black produced is controlled by regulating the rotational velocity of said nozzles.

3. A process in accordance with claim 2 wherein the rotational velocity of said nozzles is increased to increase the total velocity imparted to the hot combustion gases in order to decrease the structure of the carbon black.

4. A process in accordance with claim 1 wherein said nozzles are rotated in a direction opposite to the flow of the hot combustion gases to decrease the total velocity of the hot combustion gases in order to increase the structure of the carbon black produced.

* * * * *